United States Patent
Moon

(10) Patent No.: US 7,571,475 B2
(45) Date of Patent: Aug. 4, 2009

(54) METHOD AND ELECTRONIC DEVICE FOR TRIGGERING ZEROIZATION IN AN ELECTRONIC DEVICE

(75) Inventor: Billy G. Moon, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 849 days.

(21) Appl. No.: 11/099,877

(22) Filed: Apr. 5, 2005

(65) Prior Publication Data

US 2006/0225142 A1 Oct. 5, 2006

(51) Int. Cl.
*G06F 11/00* (2006.01)
(52) U.S. Cl. ..................................... 726/22
(58) Field of Classification Search .................. 726/22, 726/23, 24, 34, 25, 26; 713/164, 188, 189, 713/193
See application file for complete search history.

(56) References Cited

U.S. PATENT DOCUMENTS

| 6,292,898 | B1 * | 9/2001 | Sutherland | 726/34 |
| 6,347,375 | B1 * | 2/2002 | Reinert et al. | 726/24 |
| 6,931,552 | B2 * | 8/2005 | Pritchard et al. | 726/34 |
| 7,484,247 | B2 * | 1/2009 | Rozman et al. | 726/34 |
| 2002/0166061 | A1 * | 11/2002 | Falik et al. | 713/200 |
| 2005/0033980 | A1 * | 2/2005 | Willman et al. | 713/200 |

OTHER PUBLICATIONS

Cisco Systems, Zeroization, 2005, pp. 1-5.*
Cerberus Systems, Inc., National Institute of Standards and Technology, "Implementation Guidance for FIPS PUB 140-1, continued, PART 2 (sections 1-4)", 15 pages.
Lock-Out, Lock Out Products, "Why Button", Copyright © 2000-2004, 2 pages.
Legacy Marketplace, LLC and Security Solutions, LLC, "My Secure PC", 3 pages.
Communications Security Establishment (CSE) and National Institute of Standards and Technology (NIST), "Research in Motion: BlackBerry Cryptographic Kernel Policies", Copyright © 2000 (Research in Motion Limited (RIM), 6 pages.
Federal Information Processing Standards Publication 140-1, "Security Requirements for Cryptographic Modules", Jan. 11, 1994, 45 pages.
Virus.org—Hosted by Wizards Ltd., "Scan design called portal for hackers", Copyright © 1997-2005, 3 pages.

* cited by examiner

Primary Examiner—Beemnet W Dada
(74) Attorney, Agent, or Firm—Trellis IP Law Group, PC

(57) ABSTRACT

A method and apparatus for initiating a zeroization process in an electronic device is provided. Diagnostic information is provided by a plurality of sub-systems such that when one or more conditions are detected that are expected to cause the electronic device to experience a failure in the near future or if the electronic device appears to have been compromised, then the zeroization process is triggered.

20 Claims, 3 Drawing Sheets

METHOD AND ELECTRONIC DEVICE FOR TRIGGERING ZEROIZATION IN AN ELECTRONIC DEVICE

BACKGROUND AND SUMMARY OF THE INVENTION

Embodiments of this invention relate in general to electronic devices. More specifically, embodiments of this invention relate to electronic devices that require zeroization to protect stored sensitive information from being wrongfully acquired.

In mission critical electronic devices zeroization is executed to delete potentially sensitive or sensitive information from the memory before the device falls into the wrong hands or more specifically into the control of someone who should not have access to the information. While the zeroization capability is a necessity for electronic devices used by the military, homeland security or state and local police departments, such capability is also desirable for private security guards, corporate executives or others who wish to protect information stored in their electronic device.

Zeroization is a process of scrubbing memory to remove sensitive information stored in an electronic device. The memory scrubbing process includes any device or location where sensitive data may be stored.

Activation of a key or a button on the faceplate of the electronic device by an operator typically triggers, or initiates, the zeroization process. In other prior art electronic devices, zeroization occurs when the operator types in a special code. However, if an operator is unable to activate the key or button or is, for some reason, incapacitated and unable to enter the code, the sensitive information may be needlessly exposed. In other instances, even if the operator is able to manually initiate the zeroization process, the electronic device may be fully or partially inoperable thereby making it impossible to initiate the zeroization process. Clearly, there is a need to ensure that zeroization is not dependant on an operator to initiate the zeroization process.

In still other prior art devices, the zeroization process is initiated when the outer case of the electronic device is tampered with or when the temperature exceeds a selected temperature. In such devices, simply removing the power before beginning the forensic recovery of the sensitive information may defeat the zeroization mechanism. The ability for someone to open a module's cover and access sensitive information in memory before zeroization depends heavily on the design and configuration and the time between tamper detection and zeroization can be on the order of a few milliseconds to several seconds. Thus, the immediate zeroization of sensitive information means that upon detection of tampering, the electronic device must 'drop everything' and perform zeroization. However, by the time tamper detection occurs, it may already be too late to enter the state where zeroization takes place. What is needed is an automated mechanism that monitors the condition of the electronic device and initiates the zeroization process in anticipation of a trigger condition without operator intervention so that critical sensitive information is not exposed.

To overcome these disadvantages of the prior art, the present invention determines if a trigger condition has occurred or is about to occur and then initiates a zeroization process to remove sensitive information before the electronic device failure would prohibit zeroizaton.

The foregoing and additional features and advantages of this invention will become apparent from the detailed description and review of the associated drawing figures that follow.

DETAILED DESCRIPTION OF EMBODIMENTS OF THE INVENTION

Figure 1:
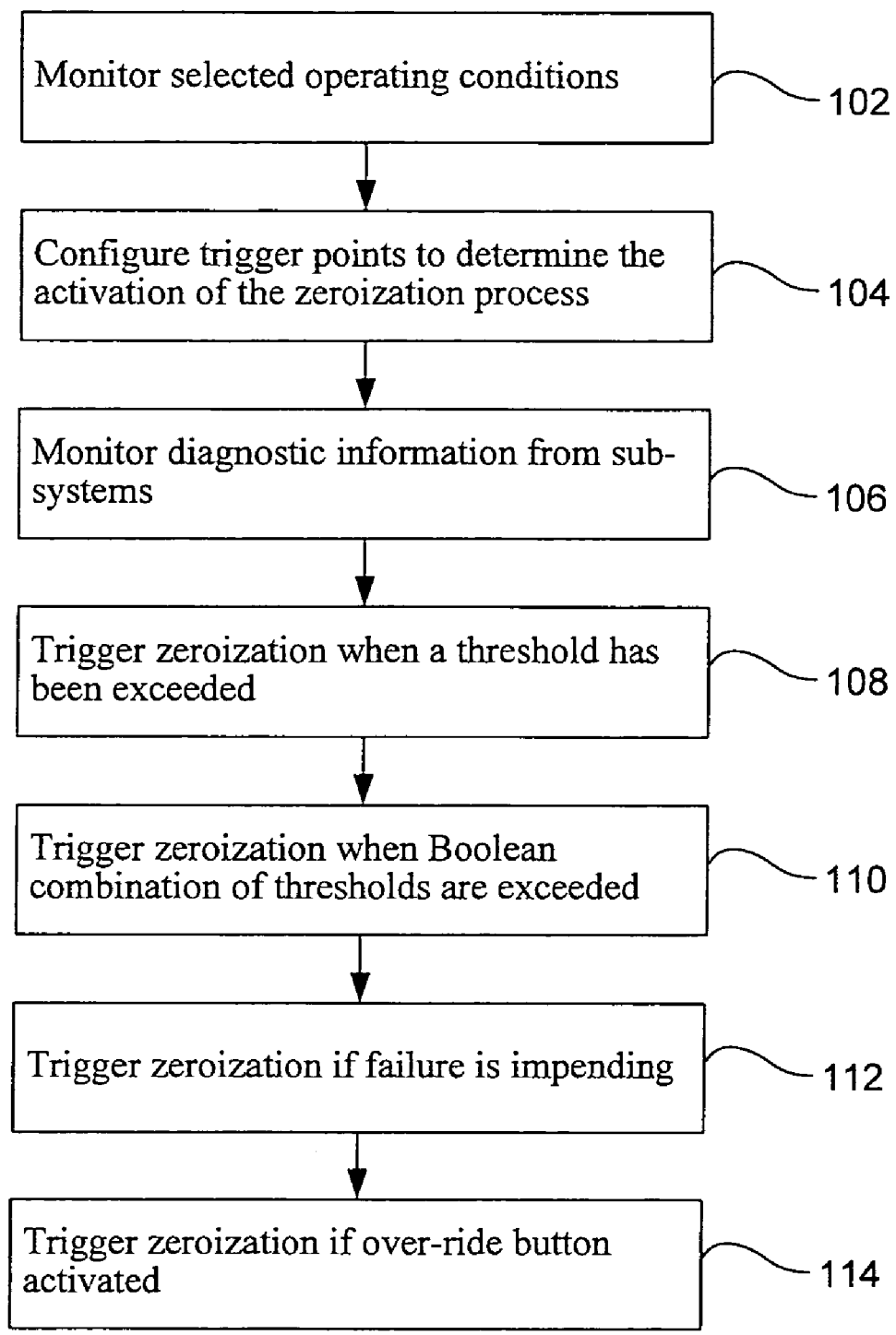
FIG. 1 illustrates a method for initiating zeroization in an electronic device, in accordance with an embodiment of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other electronic device, systems, assemblies, methods, components, parts, and/or the like. In other instances, well-known structures, materials, or operations are not specifically shown or described in detail to avoid obscuring aspects of embodiments of the present invention.

Various embodiments of the invention provide a method and system for triggering zeroization in an electronic device. The electronic device may be a mobile or personal router, cellular telephone phone, radio transmitter or receiver, portable computing device such as a PDA or notebook, or other devices where mission critical sensitive information may be stored in electronic form. As used herein sensitive information refers to information whose unauthorized disclosure could endanger national, state or corporate security or the well-being of the user of electronic device and which is intended to be kept from knowledge or unauthorized viewing. To illustrate, sensitive information may be the hardware configuration for a mobile network device or private keys used for an encryption device. Yet another example of sensitive information may be photographs or telephone numbers stored on a personal cellular telephone or confidential corporate information stored in the memory of a notebook computer or other portable personal computing device. Zeroization generally refers to deletion of hardware configurations, Field-Programmable Gate Array (FPGA) images, and information stored in main memory, cache memories, flash memory, Non-Volatile Random Access Memory (NVRAM) and other memories or locations that may contain sensitive information. Unless otherwise noted, the phrase "sensitive information" includes and encompasses hardware configurations and FPGA images as well as proprietary and confidential information stored in an electronic or magnetic fashion regardless of whether the storage medium is semiconductor, magnetic, optical or other. The purpose of the zeroization process is to make sure that such sensitive information is not forensically recoverable. In order to achieve zeroization, various well-known scrubbing techniques may be used to delete or remove the sensitive information. For example, with magnetic memory, it may be necessary to write a pattern of all 1's and then all 0's to the memory to clean out residual information retained in the magnetic storage medium. Or with semiconductor memory, a high voltage may be written to each memory location. In some cases, it may be necessary to access special circuits adapted to perform the zeroization process such as, by way of example, an erase control line that causes a bulk erase of a sector in a memory device.

FIG. 1 illustrates a method for initiating zeroization in an electronic device, in accordance with an embodiment of the invention. At step 102, selected operating conditions of the electronic device are monitored. The operating conditions are selected based on the type of electronic device, the nature of information stored therein and the nature of the mission. Typically, the monitored operating conditions are selected prior to start of each mission or when the electronic device is initially put into service.

Once one or more of the operating conditions are selected, trigger points must be set that determine the activation of the zeroization process as indicated at step 104. Determining the trigger points allows the monitoring process to be uniquely configured based on the functions performed by the electronic device, the sensitivity of the information stored in the device and the level of security required for each mission. To illustrate, if the electronic device is a personal router worn by a soldier during battle, the configuration and communication codes stored in an FPGA or NVRAM would constitute a significant breach of security if the solider is incapacitated and the enemy acquired the intact router. Thus, if motion ceased for a certain length of time, for example six minutes, the electronic device would need to automatically initiate the zeroization process. In contrast, if the electronic device is a personal cell phone containing a telephone and address list, the lack of motion may not be critical and may not even be a monitored operating condition.

In other instances, the monitoring process may be configured to consider two or more operating conditions using Boolean logic to determine when it is necessary to initiate the zeroization process. Returning to the example of the soldier's personal router, assume that motion has stopped but the GPS coordinates match the location of a forward operating base where the solider is expected to remove the personal router while he showers and sleeps. Thus, the fact that the personal router is no longer being worn by the solider, the fact that there is no detected motion for a certain length of time will not alone trigger the zeroization process.

When the mission or actual use of the device begins, the monitoring process is activated as indicated at step 106. The monitoring process involves the receipt of diagnostic information from various subsystems in the electronic device. Each diagnostic test returns a value that is compared to a pre-determined threshold. When it is determined at step 108 that a trigger condition has occurred because a threshold has been exceeded, the zeroization process is triggered in the electronic device. In other instances, a selected combination of thresholds must be exceeded nearly simultaneously before the zeroization process would be triggered as indicated at step 110. In still other instances, the diagnostic tests could return values that are indicative of an impending failure or occurance of a trigger event and that the zeroization process should be initiated as a proactive measure as indicated at step 112. In still other embodiments, the zeroization is initiated in response to the button being pushed or the key code being entered even if the monitoring process does not iindicate a trigger condition or an impending trigger or failure as indicated at step 114.

Figure 2:
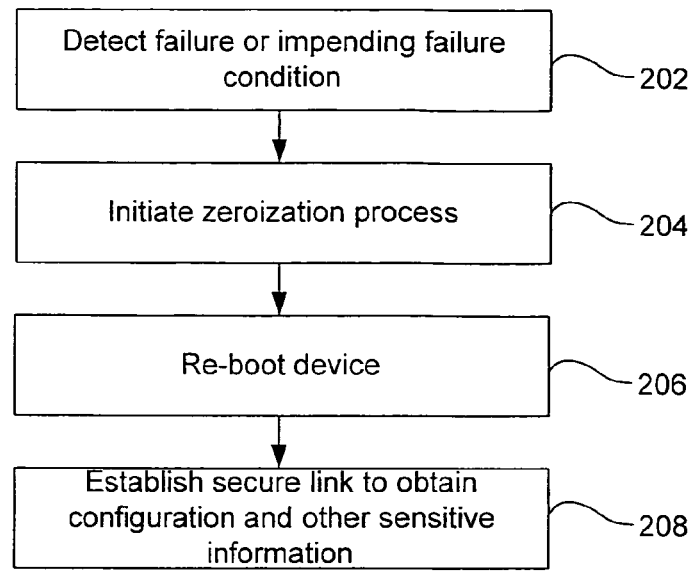
FIG. 2 illustrates a method for triggering zeroization in an electronic device, in accordance with an embodiment of the invention.

FIG. 2 illustrates a method for recovering from an autonomously initiated zeroization process in an electronic device, in accordance with an embodiment of the invention. Recovery is necessary in several instances but for certain missions, it is critical that electronic devices that have been scrubbed can, at some later time, be re-initialized and returned to service. To illustrate the scenario where re-initialization may occur, consider the example where the electronic device includes a GPS unit and the enemy is jamming the GPS signal causing the coordinates to be incorrectly read. If an ordinance delivery vehicle uses the GPS coordinates, the wrong coordinates could cause the munitions to explode at the wrong location or at the wrong time. This would be an undesirable fault condition. Thus, when jamming (or some other failure condition) is detected as indicated at step 202, the zeroization process is initiated at step 204 to scrub sensitive information from the electronic device. If at some future time the jamming (or other trigger condition) is alleviated, the electronic device may be rebooted as indicated at step 206. During the re-boot process, the electronic device may establish a secure encrypted connection to receive the sensitive information as indicated at step 208.

Figure 3:
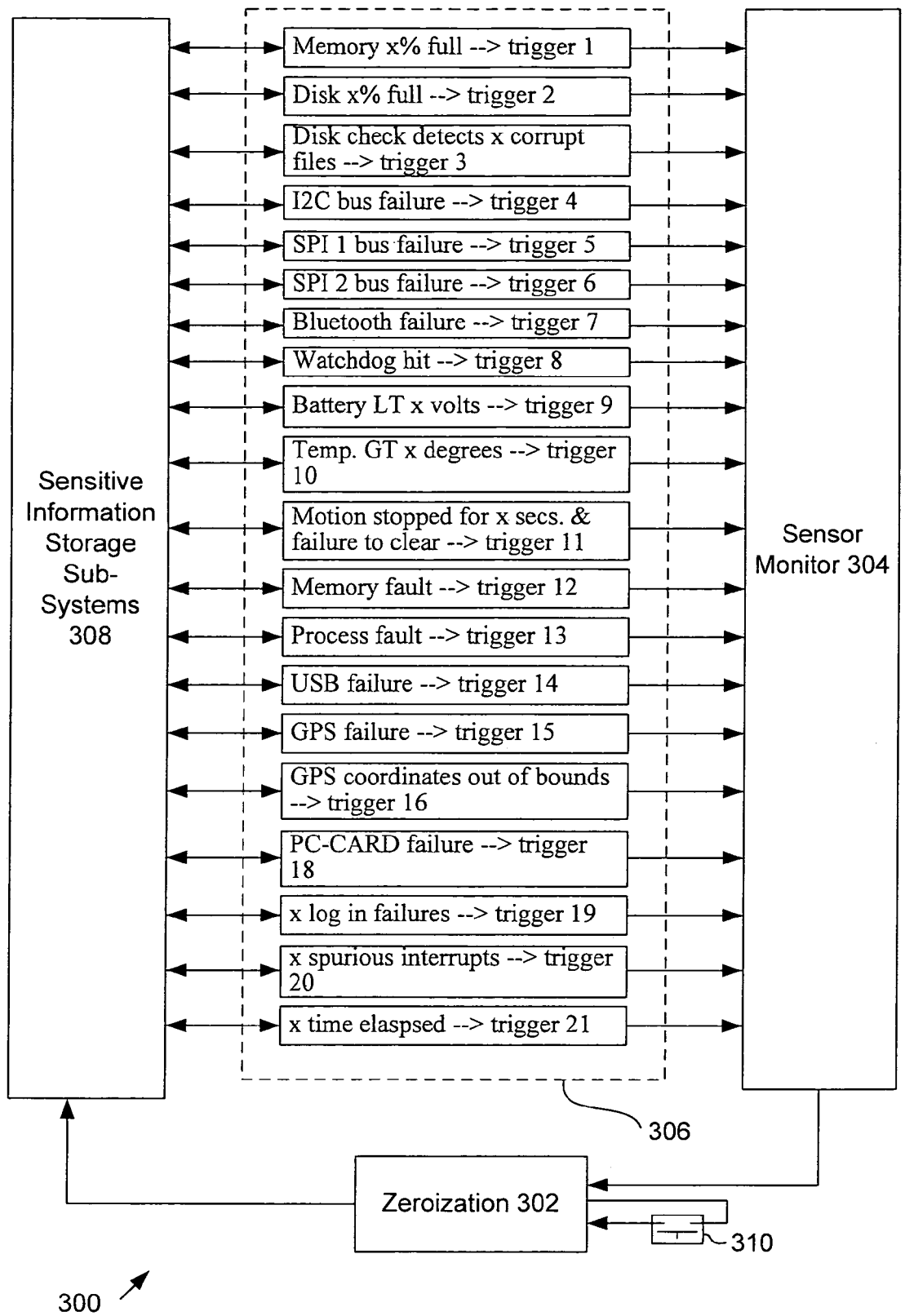
FIG. 3 is a block diagram of an electronic device for triggering zeroization in an electronic device, in accordance with an embodiment of the invention.

FIG. 3 illustrates an electronic device 300 that includes a zeroization circuit 302, a monitor 304, a plurality of sensors 306 and storage sub-systems 308 of electronic device 300 where sensitive information is stored or retained. In one embodiment, monitor 304 comprises an address space that receives interrupts from any sensor whenever an alert is generated. To ensure that the zeroization process is initiated immediately after the interrupt is generated, zeroization circuit 302 scans the address space of monitor 304 to determine if the zeroization process should be initiated. In operation, monitor 304 receives input from sensors 306 and, whenever a sensor indicates a problem, monitor 304 activates zeroization circuit 302 to zero out storage locations in sub-systems 308 where sensitive information is otherwise stored during normal operation of electronic device 300.

Sub-systems 308 include but are not limited to: magnetic or optical storage devices such as a disk drive, Field-Programmable Gate Arrays, main memory, RAM, ROM, flash memory, cache memories, flash memory, Non-volatile Random Access Memory (NVRAM), Bluetooth and other sub-systems that may store sensitive information. In general, sensitive information may be stored in any 'computer readable medium' associated with a sub-system 308.

Each of the plurality of sensors 306 comprises a trigger that can start the zeroization process either alone or in combination with other triggers. In one embodiment of the invention, one sensor, trigger 1, indicates when a RAM memory sub-system approaches full utilization. For example, if memory is 95% full, then trigger 1 will generate an interrupt to monitor 304. This interrupt is generated because an electronic device that does not have free memory will operate very slowly due to memory contention issues and the need to swap instructions from slow memory to cache or RAM for execution by the processor. If the processor is operating too slowly, it is an indication that the electronic device is not operating correctly and that is likely due to an intrusion or other attack. Thus, even though the electronic device is operating, albeit in a crippled manner, in some mission environments, zeroization may be desired because of the potential for a security breach to occur is high and the ability of the electronic device to respond is low.

Another sensor, trigger 2, monitors a disk storage sub-system. If the disk storage sub-system approaches capacity, it is an indication of an impending problem. Again, even though the electronic device is operating, in some mission environments zeroization may be desired. A sensor, trigger 3, also monitors the disk storage sub-system for corrupt files because, if corrupt files reach a threshold, it may be an indication that the security of the electronic device has been breached. Thus, zeroization occurs whenever the number of corrupt files exceeds a selected threshold. Other memory sensors, trigger 12, may monitor for memory faults.

In a typical electronic device, a number of buses are used to transfer information between sub-systems. Accordingly, a number of bus monitor sensors are employed to monitor bus activity. Thus, one trigger condition may occur when the main processor loses contact with one or more sub-systems due to a bus failure. Another trigger condition may occur when communications between two sub-systems are degraded due to unexpected bus congestion thereby rendering efficient operation impossible. The bus failure may be an Inter Integrated Circuit (I2C) bus failure or fault, trigger 4, a Serial Peripheral Interface (SPI) bus 1 failure or fault, trigger 5, SPI bus 2 failure or fault, trigger 6, and/or a Universal Serial Bus (USB) failure or fault, trigger 14. The bus sensor monitors the overall bus utilization on each channel or bus. This monitor may be executed as part of the main processor or a dedicated diagnostic processor.

Other sensors are targeted to monitoring various hardware sub-systems. Accordingly, one such sensor, trigger 7, monitors the Bluetooth network for failure or fault. Another sensor, trigger 18, monitors any PC-card failures or faults, while other sensors, triggers 15 and 16, monitor the GPS unit for failure or faults with the sub-system or erroneous readings where the coordinates that are out of expected bounds, respectively. Battery sensor, trigger 9, monitors the system's power sources for a drop in voltage below a set limit and a temperature sensor, trigger 10, monitors for a rise in ambient temperature above a selected temperature. Both limits should be set at a level that allows the electronic device to complete the zeroization process even if the voltages further declines or the temperature continues to increase.

Certain trigger conditions may occur when a watchdog timer, trigger 8, is hit. In many electronic devices, one or more sub-systems as well as the main processor may have dedicated timers that guard against certain types of system hangs. Clearly, if the electronic device was hanging, the system may not be able to timely initiate the zeroization process. The watchdog timers are periodically reset but if the timer is not timely reset, an interrupt is generated at monitor 304.

Certain other trigger condition during operation of the electronic device that may result in a number of unexpected failure log entries being generated. A sensor, trigger 19, monitors the log and generates an interrupt when the number of failures exceeds a preset log limit. Yet another sensor, trigger 20, monitors the number of spurious interrupts during the operation of the electronic device and when the number exceeds a selected threshold interrupt, an interrupt it generated.

An accelerometer sensor, trigger 11, monitors motion of electronic device 300. If there is no motion for an extended period of time and a there is a failure to enter an 'all clear' signal, the trigger generates an interrupt to monitor 304. Trigger 11 is referred to as a 'man down' trigger because the lack of motion would indicate that the wearer or operator has become incapacitated or killed.

Time elapsed sensor, trigger 21, monitors a clock and sends an interrupt to monitor when the time has elapsed indicating that the mission is complete. Thus, a monitoring device may monitor a location for a number of days at the end of which, the time elapsed sensor triggers the zeroization process rendering the device useless should it be subsequently found.

Tamper sensor, trigger 22, monitors the enclosure in which the electronic device is housed and if forced entry is detected, an interrupt is generated for monitor 304. A variety of sensors are well known in the art and may be utilized to perform the functions described above. Although the illustrated embodiment includes 22 triggers, it is to be understood that some electronic device may have more triggers and some electronic devices require fewer triggers depending on the application. Further, the sensors illustrated are typical for, by way of example, a mobile router, while other devices may include other types of sensors.

During operation, when monitor 304 receives a signal from at least one of the plurality of sensors 306, a signal is generated and applied to activate zeroization circuit 302. Zeroization circuit 302 is preferably a hardware device that receives trigger information and activates the scrubbing circuits for each sub-system 308. In one embodiment, zeroization circuit 302 is a hardware element that does not require extraneous code to execute the zeroization process. Specifically, zeroization circuit 302 comprises a 22 input logic OR gate that takes all 22 bits of memory from monitor 304 and activates the scrubbing circuit in response to any one sensor indicating a problem. In other embodiments, zeroization circuit 302 comprises an n-level deep logic circuit that comprises a plurality of OR, NOR, AND and NAND gates that are combined to form complex Boolean equations that determine when to active zeroization circuit 302. In still other embodiments, zeroization comprises a set of instructions stored in a protected portion of flash memory or other non-volatile memory. When an interrupt is generated, execution of the main processor jumps to the instructions in the protected portion. These instructions cause each of the sub-systems 308 to initiate hardware dependent zeroization algorithms. In one embodiment, zeroization circuit 302 comprises logic that is activated whenever a selected address space within monitor 304 has a non-zero value. The computer program that implements the zeroization process may include Boolean operators to enable rather complex combinations of triggers that would initiate the zeroization process.

Electronic device 300 further includes a 'panic button' 310 that may be located on the faceplate of the router. In various embodiments of the invention, panic button 310 may be a 'push button' switch attached to the 'auxiliary port' of a mobile router. Panic button 310 may be used to override the autonomic determination algorithm and allow human intervention to initiate the zeroization process. By way of example, if a military vehicle were to be abandoned, the operator could zero out the sub-systems to avoid sensitive information from being divulged to the enemy as they were exiting the vehicle.

Figure 4:
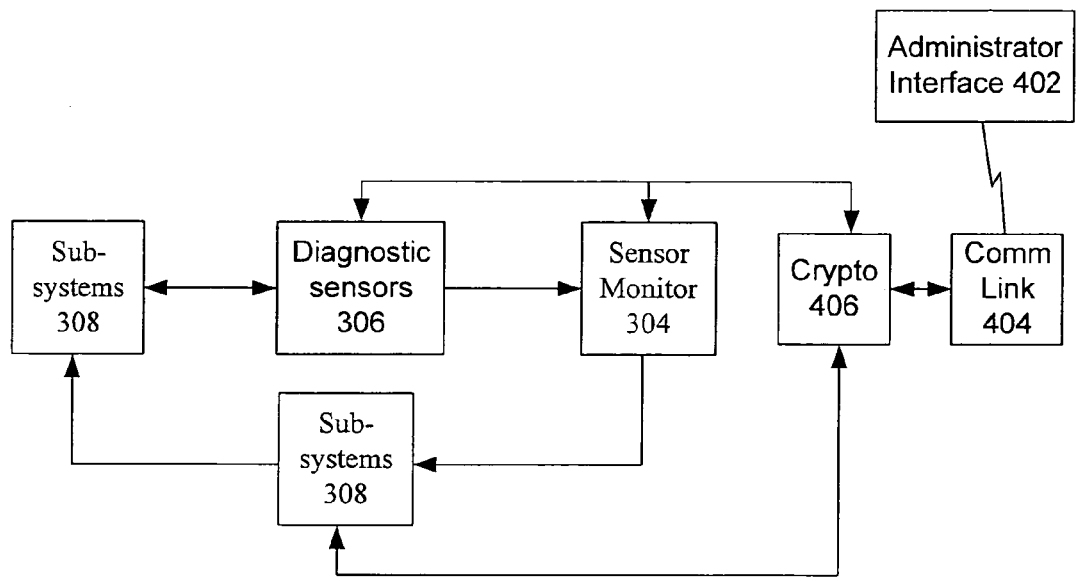
FIG. 4 is a block diagram of an electronic device for triggering zeroization in an electronic device, in accordance with another embodiment of the invention.

As shown in FIG. 4, an administrator may configure the zeroization triggering thresholds using an administrator interface 402. Typically, these thresholds are set once by an administrator with pre-existing authority to configure electronic device 300. Alternatively, the administrator may configure the trigger points based on each specific mission and the sensitivity of the mission. Administrator interface 402 is linked to electronic device 300 by a communication device 404 and a cryptographic device 406 that cooperate to establish a secure communication link for the transmission of encrypted information. Preferably, communication device 404 is a wireless communication device such as a radio or satellite or cellular telephone.

In the event that the zeroization process occurs, communication device 404 is used to establish a secure communication link for the transfer of encrypted information to re-initialize the electronic device. To illustrate use of the embodiment shown in FIG. 4, consider the example where the electronic device is a personal router worn by a soldier during battle, the configuration and communication codes for the router's operations are stored in an FPGA and NVRAM. If the enemy was to obtain a router with the network configuration and communication codes intact, it would constitute a significant breach of security because the enemy would then be able to eavesdrop on encrypted communications. Because of this risk, if one or more of the sensors were to trigger the zeroization process, sensitive information stored in sub-system 308 would be immediately scrubbed. For example, if the GPS coordinates were to suddenly change to fall outside of an expected location, then the router's configuration and other sensitive information would be scrubbed. The router would still be a functioning device because the operating system and other non-critical software parameters would still enable the machine to function at some level. When the soldier returns to base camp, it would be a simple matter for the administrator to re-set the router configuration.

The present invention provides an electronic device 300 that is adapted to determine in an autonomic manner whether a trigger condition is impending or has occurred. By triggering the zeroization process before a failure renders the device inoperable, the likelihood that the zeroization process will succeed. Embodiments of the invention have the advantage that zeroization is triggered on an electronic device before a total failure of a platform of the electronic device or complete failure of the electronic device. This results in carrying out the zeroization process more efficiently and effectively.

Although the invention has been discussed with respect to specific embodiments thereof, these embodiments are merely illustrative, and not restrictive, of the invention. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other electronic device, systems, assemblies, methods, components, materials, parts, and/or the like. In other instances, well-known structures, materials, or operations are not specifically shown or described in detail to avoid obscuring aspects of embodiments of the invention.

A 'processor' for purposes of embodiments of the invention may include any processor- or CPU-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art to activate the zeroization process or as part of the zeroization process. Stated more specifically, a computer program includes an organized list of instructions that, when executed, causes the computer to behave in a predetermined manner. A computer program contains a list of variables and a list of directions (called statements) that tell the computer what to do with the variables. The variables may represent numeric data, text, audio or graphical images.

A 'computer readable medium' for purposes of embodiments of the invention may be any medium that can contain and store, the computer program for use by or in connection with the instruction execution system electronic device, system or device. The computer readable medium can be, by way of example only but not by limitation, a semiconductor system, electronic device, system, device, or computer memory. The computer readable medium may have suitable instructions for synchronously presenting multiple video program ID streams, such as on a display screen, or for providing for input or presenting in accordance with various embodiments of the invention.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:
   monitoring a plurality of trigger conditions during operation of the electronic device, the plurality of trigger conditions defining conditions that place sensitive information stored on the electronic device at risk of an unauthorized access;
   determining whether at least one of the plurality of trigger conditions has occurred;
   initiating a zeroization process in the electronic device in response to the determining of the occurrence of the at least one of the plurality of trigger condition;
   preventing the unauthorized access of the sensitive information stored on the electronic device by removing the sensitive information from the electronic device during the zeroization process, the sensitive information remaining removed from the electronic device until after the electronic device is re-booted; and
   reconfiguring the electronic device after executing the zeroization process and re-booting the electronic device by using a secure encrypted connection to retrieve the sensitive information.

2. The method of claim 1, further comprising receiving an over-ride to manually initiate the zeroization process.

3. The method of claim 1, wherein the monitoring comprises using a plurality of diagnostic sensors, each diagnostic sensor being adapted to monitor a portion of the electronic device.

4. The method of claim 1, wherein the determining comprises logically determining whether a combination of the plurality of trigger conditions are about to occur.

5. The method of claim 4, wherein the determining comprises determining whether the electronic device is operating below a predetermined threshold.

6. The method of claim 5, wherein the determining comprises determining whether the electronic device is compromised.

7. The method of claim 6, wherein the electronic device is a mobile router.

8. An electronic device, comprising:
   a processor; and
   logic encoded in one or more tangible computer readable storage media for execution by the processor, and when executed operable to:
   monitor a plurality of trigger conditions during operation of the electronic device, the plurality of trigger conditions defining conditions that place sensitive information stored on the electronic device at risk of an unauthorized access;
   determine whether at least one of the plurality of trigger conditions has occurred;
   initiate a zeroization process in the electronic device in response to the determining of the occurrence of the at least one of the plurality of trigger conditions;
   prevent the unauthorized access of the sensitive information stored on the electronic device by removing the sensitive information from the electronic device during the zeroization process, the sensitive information remaining removed from the electronic device until after the electronic device is re-booted;
   wherein the logic when executed is further operable to reconfigure the electronic device after the electronic device is re-booted: and
   wherein a secure encrypted connection is used to retrieve the sensitive information for the reconfiguring of the electronic device.

9. The electronic device of claim 8, wherein the plurality of trigger conditions are monitored using a plurality of sensors for generating diagnostic information on the electronic device.

10. An electronic device, comprising:
    a processing system including a processor and a memory, the memory containing sensitive information;
    means for monitoring a plurality of trigger conditions during operation of the electronic device, the plurality of trigger conditions defining conditions that place the sensitive information stored on the electronic device at risk of an unauthorized access;
    means for determining whether at least one of the plurality of trigger conditions has occurred;
    means for initiating a zeroization process in the electronic device when occurrence of the at least one of the trigger condition has been determined;
    means for preventing the unauthorized access of the sensitive information stored on the electronic device by removing the sensitive information from the electronic device during the zeroization process, the sensitive information remaining removed from the electronic device until after the electronic device is re-booted; and
    means for reconfiguring the electronic device after executing the zeroization process and re-booting the electronic device by using a secure encrypted connection to retrieve the sensitive information.

11. The electronic device of claim 10, wherein the means for monitoring further comprises a trigger detecting sensor.

12. The electronic device of claim 11, wherein the trigger detecting sensor is configured for detecting an impending trigger condition.

13. The electronic device of claim 11, wherein the means for initiating comprises a zeroization initiation circuit.

14. The electronic device of claim 13, wherein the zeroization initiation circuit comprises Boolean logic circuitry for combining diagnostic information from at least two trigger detecting sensors.

15. The electronic device of claim 10, further comprising means for activating a manual over-ride to initiate the zeroization process.

16. The electronic device of claim 8, wherein the logic when executed is further operable to receive manual initiation of the zeroization process.

17. The electronic device of claim 8, wherein the zeroization process comprises writing a predetermined value into each location storing the sensitive information.

18. The electronic device of claim 17 wherein the predetermined value comprises a logical '1' value.

19. The electronic device of claim 17 wherein the predetermined value comprises a logical '0' value.

20. The electronic device of claim 8 wherein the zeroization process comprises writing a first predetermined value into each location storing the sensitive information followed by writing a second predetermined value into each location storing the sensitive information.

* * * * *

UNITED STATES PATENT AND TRADEMARK OFFICE
CERTIFICATE OF CORRECTION

PATENT NO. : 7,571,475 B2
APPLICATION NO. : 11/099877
DATED : August 4, 2009
INVENTOR(S) : Billy G. Moon It is certified that error appears in the above-identified patent and that said Letters Patent is hereby corrected as shown below:

Column 11, line 4 through Column 12 (claims 16-20): move to Column 10, line 34 (before claim 10);

Renumber claim 16 as claim 10;

Renumber claim 17 as claim 11;

Renumber claim 18 as claim 12 and in line 1: change "17" to --11--;

Col. 10, Renumber claim 10 as claim 15;

Col. 10, Renumber claim 11 as claim 16 and in line 1: change "10" to --15--;

Col. 10, Renumber claim 12 as claim 17 and in line 1: change "11" to --16--;

Col. 10, Renumber claim 13 as claim 18 and in line 1: change "11" to --16--;

Col. 10, Renumber claim 14 as claim 19 and in line 1: change "13" to --18--;

Col. 12, Renumber claim 19 as claim 13 and in line 1: change "17" to --11--;

Col. 12, Renumber claim 20 as claim 14;

Col. 15, Renumber claim 15 as claim 20 and in line 1: change "10" to --15--.

Signed and Sealed this

Twenty-fifth Day of May, 2010

David J. Kappos
*Director of the United States Patent and Trademark Office*